UNITED STATES PATENT OFFICE.

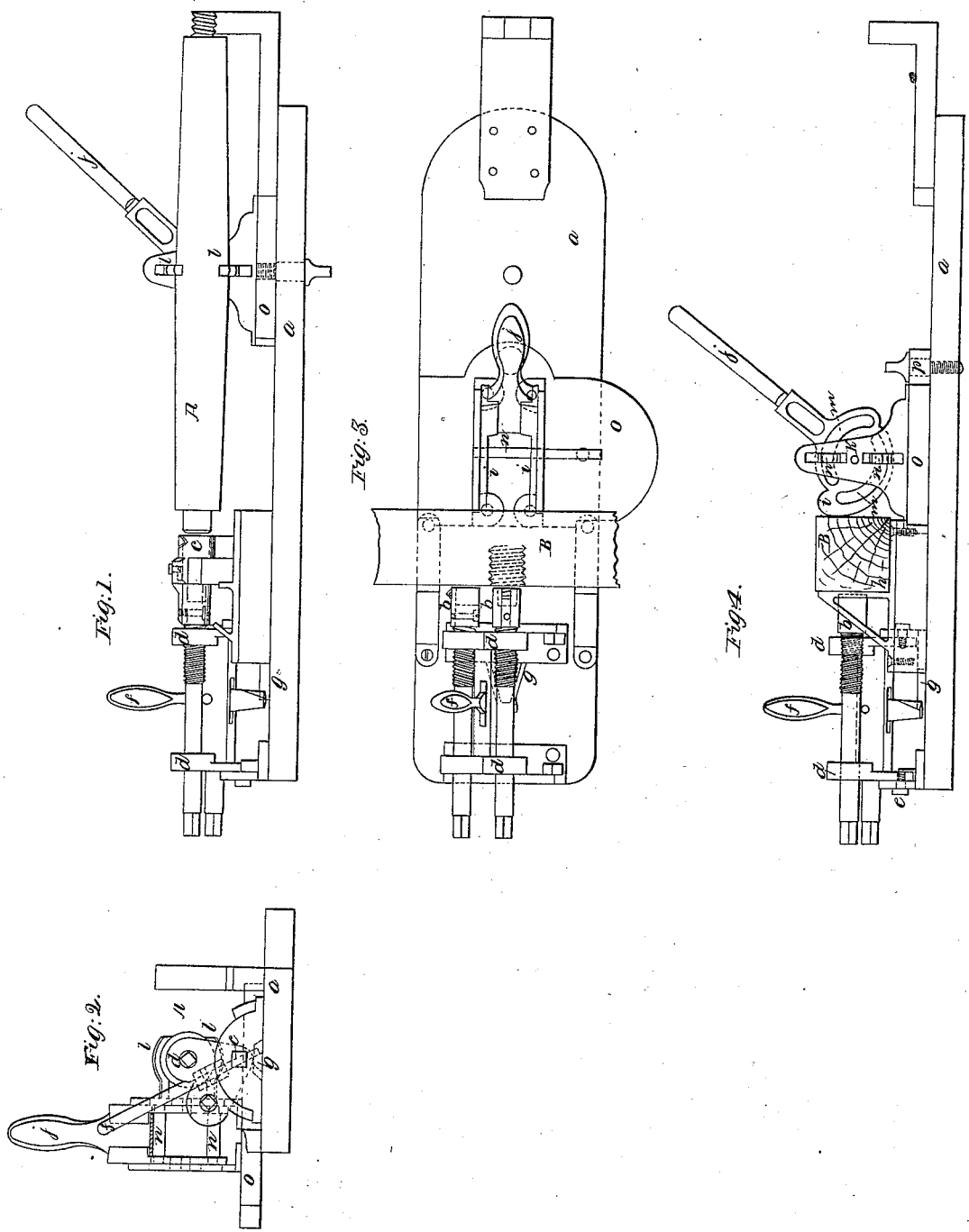

J. PARSONS OWEN, OF NORWALK, OHIO.

MACHINE FOR CUTTING SCREWS ON BEDSTEAD-RAILS, &c.

Specification forming part of Letters Patent No. 10,257, dated November 22, 1853.

*To all whom it may concern:*

Be it known that I, J. PARSONS OWEN, of Norwalk, in the county of Huron and State of Ohio, have invented a new and useful Improvement in Machines for Cutting Screws for Bedsteads; and I do hereby declare that the following is a full, clear, and exact description of the construction and operation of the same, reference being had to the annexed drawings, forming part of this specification, in which—

Figure 1 is a side elevation of the machine as employed for cutting the screws upon rails. Fig. 2 is an end elevation of same. Fig. 3 is a plan of the machine when used for cutting screws in posts. Fig. 4 is a side elevation of the same.

Similar letters of reference in the several figures denote the same part of the machine.

My invention refers to the manner of holding the posts and rails, and also to the mode of arranging the mandrels for cutting right and left screws.

It consists in the use of eccentric cams faced with soft metal and operated by a lever for holding the post in position, and also in the construction of said cams with eccentric grooves, which so operate jaws moving in them as to hold the rail firmly for cutting the screw, the cutting being effected in both cases by reciprocating mandrels—one with a right and the other with a left screw—so supported by an oscillating frame that either can be used when occasion requires, the frame being locked by a lever and wedge during the cutting operation.

In the drawings, $a$ is the bed; $b$, the mandrel-heads for cutting the post-thread, and $c$ those for cutting the rail. These mandrels work in the frame $d$, movable about the bolts $e$, and held in position by the lever $f$ pressing against one side of the wedge $g$. The post is held in position by resting in the bed $h$, into which it is tightly pressed by the cams $i$. These cams are operated by the lever $j$ and move about the journals $k$. In their faces are the grooves $m$, in which are the bars $n$, terminating in the jaws $l$. The eccentricity of the grooves $m$ causes the bars to have a vertical motion as the cams are moved backward or forward, so as to grasp tightly the rail, as shown in Figs. 1 and 2, and again unloose it when occasion requires. For securing the post the bench $o$ is fastened to the bed $a$ by the screw $p$, and when employed for holding the rail its position is changed, as shown in Figs. 1 and 2. The mandrels in the several cases remain the same, the change being effected by removing the cutter-heads of one kind of screw and securing to them those of the other description.

The operation of my machine is as follows: Having first screwed upon the mandrels the required cutters—for instance, that for the male thread—the rail A is inserted between the jaws $l$ and the lever $j$ moved, as indicated by arrow 1, which clamps the rail securely for the operation. The cutter having the required thread is next placed in the prolongation of the rail by giving the frame $d$ the proper position, after which the lever $f$ is pressed against the wedge $g$, locking the frame and permitting the mandrel to be moved forward and cut the screw. The cutter is thrown back clear of the thread and the rail reversed by revolving the table $o$ about the pin, securing it so as to bring the end into a position to be cut. The lever $f$ is thrown clear of the wedge $g$ and the frame $d$ revolved, bringing the other mandrel in the prolongation of the rail, when the frame $d$ is again locked and a screw with the reverse thread cut on the rail. The male cutter-heads $c$ are then removed from the mandrels, and the V's for cutting the posts (marked $b$) placed upon them, the bench $o$ being at the same time secured, as seen in Figs. 3 and 4. This permits the cams $i$ to act against the side of the post B by the movement of the lever $j$, so as to hold it in the bed $h$. This being accomplished, the threads, both right and left, are cut as above described.

The advantage of this machine consists in the simplicity of arrangement and effectual manners in which the reciprocating mandrels are operated for cutting the right and left threads, together with the strength of the holding arrangement and its ease of operation. The arrangement of the parts and the general mode of operation cannot fail to render its merits evident to all who are acquainted with machines of this character.

I claim nothing in the construction of the mandrels and cutters; but

What I do claim as my invention, and desire to secure by Letters Patent, is—

1. Supporting the mandrels in the oscillatory frame $d$, as described, which, in combination with the lever $f$ and wedge $g$, permits either mandrel to be brought effectively into operation for cutting, substantially as herein fully set forth.

2. The eccentric grooves $m$ of the cams $i$, in combination with the bars $n$, substantially as and for the purposes herein set forth.

In testimony whereof I have hereunto signed my name before two subscribing witnesses.

J. PARSONS OWEN.

Witnesses:
FRANKN. SAWYER,
JAS. A. WILKINSON.